United States Patent [19]

Meyer

[11] 3,775,858
[45] Dec. 4, 1973

[54] GRADED GAUGE

[76] Inventor: Hans Meyer, Bugnon, 24, Renens (Vaud), Switzerland

[22] Filed: Apr. 13, 1971

[21] Appl. No.: 133,599

[30] Foreign Application Priority Data
Apr. 30, 1970 Switzerland.................... 6577/70

[52] U.S. Cl. ........................... 33/168 R, 33/143 R
[51] Int. Cl. ............................................. G01b 3/38
[58] Field of Search .................. 33/168 R, 168 B, 33/169 R, 170, 143 R

[56] References Cited
UNITED STATES PATENTS

| | | | |
|---|---|---|---|
| 3,180,029 | 4/1965 | Perwas................................. | 33/170 |
| 3,426,436 | 2/1969 | Perwas................................. | 33/168 R |
| 3,184,856 | 5/1965 | Theuerkauf et al................. | 33/169 R |
| 3,115,708 | 12/1963 | Roy..................................... | 33/170 UX |
| 3,295,217 | 1/1967 | Barry................................... | 33/170 |
| 2,831,256 | 4/1958 | Werle.................................. | 33/168 R |
| 3,258,845 | 7/1966 | Wiegel................................. | 33/170 |

*Primary Examiner*—William D. Martin, Jr.
*Attorney*—Emory L. Groff and Emory L. Groff, Jr.

[57] ABSTRACT

A graded gauge comprising a carrier body carrying a plurality of measuring contact blocks, the spacing between which is accurately defined, each block providing a pair of oppositely facing measuring surfaces formed on cooperating superposed measuring members, the outline of each of which is recessed so as to uncover the measuring surface of the cooperating member. The assembly of the parts is performed by means of terminal plates and spacers, holding said parts in position during their fixing on the carrier body, preferably by means of an epoxy resin, introduced between the blocks and the carrier body.

2 Claims, 5 Drawing Figures

PATENTED DEC 4 1973 3,775,858
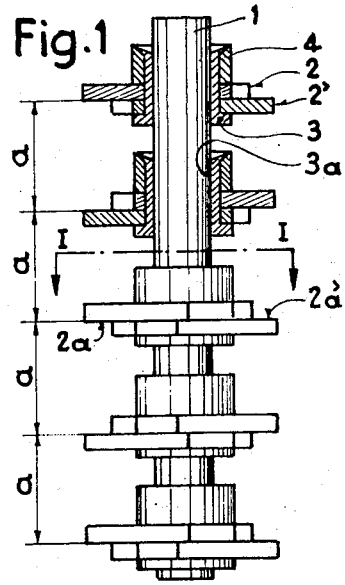
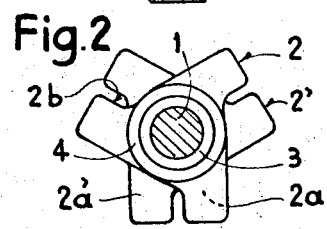
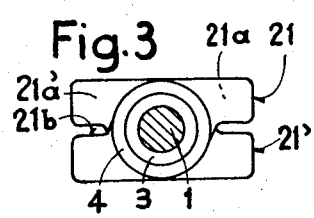
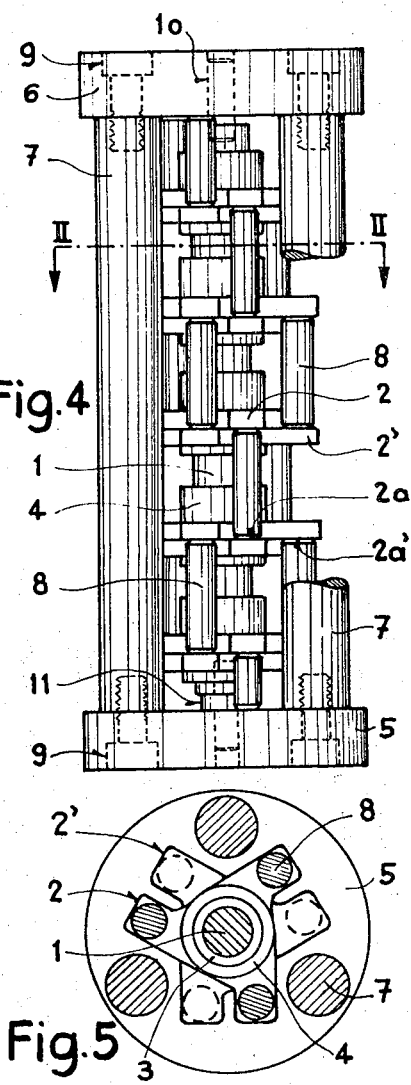
INVENTOR
HANS MEYER
BY Emory L. Groff Jr.
ATTORNEY

GRADED GAUGE

My invention has for its object a graded gauge for measuring instruments and also a method for its manufacture. Such gauges serve as a measuring base for comparative measurements. They may comprise a body on which measuring contact blocks are provided at predetermined spaced locations. This body may be associated with a micrometric gauge when it is desired to obtain a fine measurement of the spacing to be transferred.

Graded gauges are known which comprise a series of adjacent slip gauges which are laterally displaced with reference to one another in a manner such that a fraction of their surfaces provided for contact may be accessible for measuring purposes. In order to build up such a series of gauges and obtain a high degree of accuracy for measuring purposes, the gauges must be worked to very close tolerances because their individual errors are added up in the assembly. In contradistinction, the present invention covers a graded gauge wherein the different contact blocks comprise two measuring members each provided with a measuring surface and which are held together by clamping elements in a manner such that the measuring surfaces of said two members are coplanar while the different contact blocks are secured independently of one another on a carrier body, the measuring members being provided along their periphery with recessed portions uncovering corresponding sections of the measuring surface on the cooperating measuring member.

My invention has for its further object a method for manufacturing such as graded gauge, which method provides an easy manner of securing the different contact blocks to the carrier body, whereby the desired spacings between their measuring surfaces may be observed with a high accuracy.

The advantage of my invention resides primarily in the fact that the height or thickness of the different measuring members is not responsible for inaccuracies in the complete assembly as in the case of gauges made up of slip gauges and, in contradistinction, accuracy is based solely in the present case on the spacing between the contact blocks, which spacing may be readily and accurately obtained by the steps contemplated for the execution of the gauge in conformity with the method disclosed hereinafter. This method leads to producing measuring members made up of easily made parts which may be assembled by very simple operations so as to form a complete high-grade gauge.

My invention also easily allows the manufacture of graded gauges, submitted to special temperature conditions. It is sufficient in such a case to make only the carrier body of a suitable material such as Invar steel, while the material of the measuring blocks does not need to be so selected, it being of no practical influence on the accuracy of the gauge. In the prior above-mentioned graded gauges, the material forming the slip gauges had, in such cases, to be suitably selected, which is an expensive procedure as experience shows.

The improved gauge and the method of its execution are disclosed hereinafter, reference being made to the accompanying drawings illustrating an advantageous embodiment and wherein:

FIG. 1 is an elevational, partial sectional view of the graded gauge,

FIG. 2 is a cross-section thereof in a plane passing through line I—I of FIG. 1, FIG. 3 is a transverse cross-section of a modified gauge, FIG. 4 illustrates a gauge when clamped for assembly in a fixture, FIG. 5 is a cross-section of the arrangement illustrated in FIG. 4 in a plane passing through line II—II of FIG. 4.

The graded gauge illustrated in FIGS. 1 and 2 includes a cylindrical carrier body 1 to which the measuring contact blocks are secured. Each contact block is constituted by two measuring members 2 and 2' which are held in contacting relationship by two parts 3 and 4 which are riveted together.

The shape of the measuring members 2 and 2' in each block is illustrated in FIG. 2. Said measuring members are each provided with three recessed portions 2b so as to uncover corresponding surface areas such as 2a, 2'a on the cooperating measuring members. Thus, the same measuring plane is provided with three areas, angularly displaced with reference to one another and which are available for measuring purposes. The advantage of this arrangement is thus twofold: firstly, since each measuring stage of the improved gauge provides six individual areas 2a, 2'a whereas conventional embodiments are provided only with two or three individual areas, a much longer life may be expected for said improved gauge. Secondly, the arrangement disclosed ensures the advantages of a three-point bearing surface during the manufacture of the gauge as described hereinafter.

It should be noted that the shape of the measuring members may differ from that illustrated in FIG. 2. For instance, and as shown in FIG. 3, it is possible to limit the number of individual contacting areas in each measuring plane to four, in which case only two recessed parts 21b are formed in each measuring member 21–21' so as to uncover two individual contacting areas 21a, 21'a in each of said members. Again, the measuring members may be divided into four sections or more according to requirements.

The contact blocks are secured to the carrier body 1 independently of one another in a manner such that the measuring planes thereon are spaced by distances $a$ (FIG. 1). For the observation of such a spacing, the value of the thickness of each measuring member is irrelevant, which means that the execution of the blocks is a somewhat inexpensive matter.

In the exemplification according to FIG. 1, the graded gauge is provided with five measuring contact blocks spaced by equal distances $a$. Any other desired arrangement of the contact blocks is however possible, including a distribution with a non uniform spacing.

Normally, the different parts of the gauge are made of steel. In so far as other requirements relating to temperature conditions are laid down, it is possible to select a different suitable material for the carrier body 1, while the blocks retain their original material. The selection of Invar steel for the carrier body allows the production of a graded gauge with a specially low sensitivity to heat, even if the measuring contact blocks are made of ordinary steel.

The measuring members may satisfy in the usual manner various requirements such as resistance to rust, hardness, resistance to wear, as provided by a suitable selection of material or appropriate coatings.

The graded gauge disclosed is advantageously manufactured by means of a device such as that illustrated in FIGS. 4 and 5. Said device includes two end-plates 5 and 6 between which are fitted supports 7 of an accurate predetermined length, which are secured to the end plates by the screws 9. The carrier body 1 is caused to rest freely on a stud 11 inserted in the lower end-plate 5 while its upper end is centered by a stud 10 carried by the upper endplate 10. Before they enter the device, the contact blocks are provided with glue within their central bore (FIG. 1) and then threaded in sequence over the carrier body 1. To this end, it is advantageous to resort to an epoxy resin which becomes hard at room temperature. Other means of securing the blocks may be used, provided the blocks are rigidly secured without any possible shifting once they have been set in their proper location. The interposition of outer spacers 8 resting on the cooperating measuring surfaces 2a and 2'a holds the blocks in their correct location until the glue has set. At the end of the assembling procedure, the outer spacers 8 and the end plates 5 and 6 are removed and are stored for further use.

I claim:

1. A graded gage comprising, in combination with an elongated carrier body, a plurality of measuring contact blocks each including two superposed measuring members, each of said members provided with recessed portions uncovering a measuring surface on the cooperating measuring member in the same block, said measuring surfaces on the measuring members in each block facing opposite directions and extending in a common plane perpendicular to the axis of the carrier body, said measuring blocks being fixed to the carrier body without mutual contact, whereby said measuring faces of two following blocks are arranged so as to permit the axial introduction between them of spacers disposed around the carrier body, thus allowing the securing of the measuring contact blocks in predetermined spaced distances on the carrier body, said spacers being removed after assembly and being reserved for the assembly of other graded gages.

2. A graded gage comprising, in combination with an elongated carrier body, a plurality of measuring contact blocks each including each two superposed measuring members each of said members provided with three recessed portions uncovering three measuring surfaces in the cooperating member in the same block and regularly arranged around the axis of the carrier body, said measuring surfaces on the measuring members in each block facing opposite directions and extending in a common plane perpendicular to the axis of the carrier body, the measuring blocks being fixed to the carrier body without mutual contact in an axial direction, whereby three surfaces of two following blocks forming pairs permit the axial introduction between them of spacers allowing the measuring blocks to be maintained in predetermined distance during the securing of said blocks on the carrier body, said spacers being removed after fixation and being reserved for the assembly of other graded gages.

* * * * *